United States Patent Office 2,879,214
Patented Mar. 24, 1959

2,879,214

PREPARATION OF DI-ESTERS OF SULFO-DICARBOXYLIC ACIDS

Ralph Dettmer Divine, Westfield, N.J., assignor to American Cyanamid Company, New York, N.Y., a corporation of Maine No Drawing. Application October 27, 1955
Serial No. 543,254

8 Claims. (Cl. 204—158)

The present invention relates to di-esters of aliphatic sulfo-dicarboxylic acids and to new improved methods of producing such di-esters. More specifically, the present invention relates to the use of actinic light or ultraviolet radiations to catalyze and expedite the sulfonation step in the manufacture of such sulfo-esters.

Di-esters of saturated aliphatic sulfodicarboxylic acids such as, for example, mono and disulfosuccinic, sulfoglutaric, sulfoadipic, sulfopimelic, sulfosuberic, sulfoazelaic, sulfosebacic, sulfodimethylsuccinic, sulfomethylglutaric, sulfooctylglutaric and other sulfonated dicarboxylic acids of the aliphatic series have been prepared hitherto by methods disclosed in U.S. Patent 2,028,091, issued January 14, 1936.

These di-esters may be more specifically described by the following structural formula:

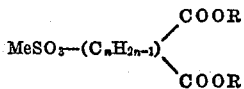

wherein Me is a salt-forming cation including alkali metals, such as sodium and potassium, ammonium and amine bases such as, for example, methyl ammonium, dimethyl ammonium, trimethyl ammonium, ethyl ammonium, diethyl ammonium, triethylammonium, triethanolammonium, pyridinium, etc.; $n$ is a small integer ranging from 2 to about 8; and R is an alkyl group such as methyl, ethyl propyl, isopropyl, butyl, isobutyl, amyl, isoamyl, hexyl, heptyl, octyl, nonyl, decyl, tridecyl, hexadecyl, octadecyl, etc.

These esters, particularly in the form of their alkali metal salts, are of great importance in industry by reason of their extraordinary wetting powers in various aqueous and organic solution, emulsions or suspensions. They are also of importance as detergents, emulsifying agents, and the like. Other typical uses for the esters of the present invention are noted in said U.S. Patent 2,028,091.

The processes described in this patent have been employed in industry and have been found to be generally satisfactory in substantially all cases. However, it has been observed that the length of time required for the overall manufacture of these esters is rather long (sometimes ranging up to 20 hours) and, consequently, efforts have been directed towards improved procedures intended to shorten the required reaction time. Many of these efforts have been moderately successful but none of them has reduced the time element to a completely satisfactory point.

It is therefore a principal object of the present invention to provide improved methods of commercially manufacturing these esters by procedures requiring less time.

It has been found that the sulfonation step of these commercial manufacturing procedures may be catalyzed and expedited by the use of ultraviolet radiations whereby the time required to carry out the addition of sodium bisulfite to the esters of the dicarboxylic acids is reduced.

The ultraviolet radiations, however, must be of sufficient intensity in order that an observable effect be noted on the time required for the sulfonation step. It has been established that observable effects can be detected with radiations having an effective minimum intensity of at least 1000 microwatts per square centimeter throughout substantially the entire reaction mixture and that the catalyzing effects are increased as the intensity of the radiation is increased.

Although the overall wave length range of ultraviolet radiations normally extends from about 4000 Angstrom units down to as low as 40 Angstrom units, the difficulties in obtaining commercially utilizable radiations from about 2000 Angstrom units down to 40 Angstrom units makes such a low range commercially undesirable. However, with the use of envelopes or containers of ultraviolet-transmitting glass such as Pyrex No. 9700 (Corex D), ultraviolet radiations may be easily obtained from 4000 Angstrom units down to about 2920 Angstrom units and, with the use of quartz envelopes or containers, this may be extended down to about 2000 Angstrom units.

The source of the ultraviolet radiations may be any photochemical or light means capable of yielding the desired radiations within the specified ranges and having the desired intensities. Such a source is typified by the common mercury arc Pyrex glass lamp, which normally covers the range of from about 2800–2920 to about 3800 Angstrom units with a maximum intensity approximately at about 3650 Angstrom units. The use of quartz envelopes reduces the lower limit of this range to below 2800 to about 2000 Angstrom units, as noted hereinabove.

The size or number of sources employed for this photochemical purpose will depend upon many factors, such as the size, shape and material characteristics of the reaction vessel, the degree of catalyzing effect desired, the nature and properties of the reactants, the positioning, shielding and direction of emission of the lamps, etc. For example, one single lamp could be placed immediately adjacent a glass reaction vessel, say, within one or two centimeters thereof, and be so shielded and directed that considerable catalyzing effect would be noted. A pair of such lamps could also be used, if desired, and positioned on opposite sides of the glass reaction vessel to increase the catalyzing effect. When the reaction kettle or vessel is made of a material (such as stainless steel) which would impede or prevent the ultraviolet radiations from penetrating and bringing about their catalyzing effect, or when the reaction is carried out in a closed, opaque reactor, the lamps are placed within the reaction vessel itself and take the form of a single long tube emitting the ultraviolet radiations. If desired, a plurality of such sources could be employed.

It is preferred to use a plurality of ultraviolet radiation sources inasmuch as the variation in intensity from one area to another is thereby reduced. For example, the use of a General Electric AH–6, 1000 watt (quartz envelope) would create intensities of up to about 15.5 watts per square centimeter for portions of the reaction zone within two centimeters whereas other portions, at a distance of, say, eight centimeters, would receive less than 1 watt per square centimeter. The use of a plurality of smaller lamps would even these figures out to a greater degree.

Additionally, where the ultraviolet radiation source is outside the reaction vessel and the radiations must pass through the material of which the vessel is made before irradiating the reaction mixture, it is essential that the reaction vessel be made of a material which transmits ultraviolet radiations, such materials as "Pyrex," "Corex," "Vycor," or quartz being satisfactory.

The invention will be described more specifically by the following examples but it is to be pointed out that these examples are primarily illustrative and that they are not to be construed as limitative of the present invention.

EXAMPLE 1

Esterification procedure

The preparation of di-iso-octyl maleate was carried out in a three-liter, three-neck flask equipped with a reflux condenser having a trap for withdrawing water during esterification, a thermometer and a mechanical stirrer. Heat was supplied for the reaction by an electric mantle, such as a "Glascol" mantle.

Two batches of di-iso-octyl maleate were prepared. Both batches contained the same charge of materials, as follows:

|  | Grams | Moles |
| --- | --- | --- |
| Iso-octyl alcohol | 1,514.2 | 11.50 |
| Maleic anhydride | 495.2 | 5.05 |
| Naphthalene B-sulfonic acid | 3.5 | 0.017 |

15% excess alcohol was used to assure completion of the reaction.

After all the materials had been added, the slurry was heated and water was withdrawn through the trap during esterification. The temperature of reaction was never allowed to exceed 140° C. After approximately 80 to 90 cc. of water had been collected, the batches were tested for acidity which (after approximately 4.5 hours of reaction time) was found to have decreased to about 0.17%. To these batches was added 70.5 cc. of 5% sodium for neutralization purposes. After agitation and settling, the aqueous layer was withdrawn and discarded and the organic layer was washed with two 50 cc. portions of water and retained.

Both batches were steam stripped at a maximum temperature of about 135° C. in order to remove the excess alcohol. When the distillate indicated that no more iso-octyl alcohol was coming over, both batches were blown dry at about 115° C. with a stream of nitrogen gas. After about 2.5 hours of blowing and heating, the batches were analyzed for water. Both batches were found to contain less than about 0.06% water and the heating was discontinued. Both batches were treated with approximately 1% "Darco" as a filter aid and filtered. The first batch gave 1674 grams of ester and the second batch gave 1650 grams for an average yield of about 96.6%, based on maleic anhydride.

The following is a typical analysis of di-iso-octyl maleate for both batches:

| | |
| --- | --- |
| Specific gravity | 0.9443 |
| Color (APHA) | 15 |
| Acidity | 0.0026 |
| Purity percent | 99.92 |
| Water do | 0.06 |

Sulfonation procedure

The apparatus used for the sulfonation step was a two-liter, three-neck flask equipped with a reflux condenser, thermometer and agitator. Heat was supplied by an electric mantle such as a Glascol mantle.

The usual methods of preparation (reference U. S. Patent 2,028,091) were employed with the following materials:

|  | Grams | Moles |
| --- | --- | --- |
| Di-iso-octyl maleate | 680 | 2 |
| Sodium bisulfite, 106% | 196 | 2 |
| Water | 225 |  |
| Ethyl alcohol (2B) | 77 |  |
| Di-iso-octyl sodium sulfosuccinate (75%) | 20 |  |

This preparation proceeded fairly rapidly to completion with one addition of sodium pyrosulfite (meta-bisulfite) (9 grams) being added after about 3 hours and 20 minutes of reaction time. The total time under the reflux temperature (from about 84 to about 98° C.) was about 7.33 hours. The acid number at the conclusion of the reaction was about 1.1 to 1.3. The unreacted maleate was approximately 0.6% after 7.33 hours.

The effect of ultraviolet light on the sulfonation reaction

The apparatus used for the sulfonation step wherein the catalyzing effect of ultraviolet light was observed was a one-liter, three-neck flask (13 cms. diameter) equipped with a reflux condenser, thermometer and agitator. Heat was supplied by an electric mantle such as a "Glascol" mantle. A 100 watt mercury arc lamp (General Electric Type AH-4 having a maximum intensity at 3650 Angstrom units) was placed immediately next to the flask (about 1 cm. away) above the Glascol mantle.

This ultraviolet radiation source was a point source located at the geometric center of a shielding device, the interior surfaces of which were a black color. The shielding device was circular in cross-section with one quadrant removed, through which quadrant the ultraviolet radiations were emitted whereby approximately ¼ of the total ultraviolet radiation passed through the reaction mixture in expanding cone-shaped fashion wherein the base thereof resembles a circle in area and the apex a right angle. Consequently, at a distance of 1 centimeter, the area of the base would be 3.14 square centimeters approximately.

This type of lamp (AH-4) emitted about 0.03 watt in the 2800-3200 Angstrom unit range and about 2.3 watts in the 3200-3800 range. The total ultraviolet wattage (2.33 watts), shielded and directed (as described herein) onto a 1-liter flask having a diameter of approximately 13 cms., created a minimum intensity of at least about 1000 microwatts per square centimeter at the outer fringes of the radiation area.

The materials for the reaction were as follows:

|  | Grams | Moles |
| --- | --- | --- |
| Di-iso-octyl maleate | 340 | 1.00 |
| Sodium bisulfite 106% | 100 | 1.02 |
| Water | 113 |  |
| Ethyl Alcohol (2B) | 39 |  |
| Di-iso-octyl sodium sulfosuccinate | 10 |  |

The reaction temperature was maintained between 83° C. and 88° C. An adjustment of 2.5 grams of sodium pyrosulfite (meta-bisulfite) was added after 3 hours and thirty-five minutes of refluxing. The completion of the reaction was indicated at only about 4.75 hours, at which time the acid number was determined to be less than 0.5. The unreacted maleate was approximately 0.45%.

EXAMPLE 1-A

The sulfonation procedures set forth in Example 1 were followed substantially as set forth therein except that a General Electric AH-3 (85 watt) mercury arc glass lamp was used. This lamp transmits about 85% of the power and intensity transmitted by the AH-4 lamp of Example 1 and the decrease of reaction time was correspondingly less.

EXAMPLE 1-B

The sulfonation procedures set forth in Example 1 were followed substantially as set forth therein with the following materials:

|  | Grams | Moles |
| --- | --- | --- |
| Di-iso-octyl maleate | 8,840 | 26 |
| Sodium bisulfite 106% | 2,600 | 26.52 |
| Water | 2,940 |  |
| Ethyl Alcohol (2B) | 1,040 |  |

The reaction was carried out in a 22-liter flask (35 cm. diameter), using a GE AH-6 (1000 watt) mercury arc Pyrex glass-envelope lamp. This lamp emitted 6.8 watts in the 2800–3200 Angstrom unit range and 62 watts in the ultraviolet range above 3200. The decrease in reaction time was greater than that noted in Example 1.

EXAMPLE 1–C

The sulfonation procedures set forth in Example 1–B were carried out substantially as set forth therein with the same materials in the same type flask (22 l.) but using a GE AH-6 (1000 watt) mercury arc quartz-envelope lamp (water cooled). This lamp emitted: (1) approximately 31 watts in the ultraviolet range below 2800 and down to approximately 2000 Angstrom units; (2) approximately 75 watts in the 2800–3200 Angstrom unit range and (3) approximately 90 watts in the 3200–3800 Angstrom unit range. The use of the quartz-envelope increased the power and intensity of the ultraviolet radiations considerably over a wider range whereby the decrease in reaction time was greater than that noted in any preceding examples.

EXAMPLE 2

The apparatus used for the sulfonation step in this example was a one-liter, three-neck flask equipped with a reflux condenser, thermometer and agitator. Heat was supplied by an electric mantle such as a "Glascol" mantle. A 100 watt mercury arc lamp (General Electric Type AH–4) was placed immediately next to the flask (about 1 cm. away) above the Glascol mantle.

The materials for the reaction were as follows:

|  | Grams | Moles |
| --- | --- | --- |
| Bis-methylamyl maleate | 284 | 1.00 |
| Sodium bisulfite 106% | 100 | 1.02 |
| Water | 113 | |
| Ethyl Alcohol (2B) | 39 | |

The reaction temperature was maintained between 83° C. and 88° C. 2.5 grams of sodium pyrosulfite (meta-bisulfite) were added after 3½ hours of refluxing. The completion of the reaction was indicated at only about 5.5 hours, at which time the acid number was determined to be less than 0.6.

EXAMPLE 3

The apparatus used for the sulfonation step in this preparation was a two-liter, three-neck flask equipped with a reflux condenser, thermometer and agitator. Heat was supplied by an electric mantle such as a "Glascol" mantle. A 100 watt mercury arc lamp (General Electric Type AH–4) was placed immediately next to the flask (about 1 cm. away) above the Glascol mantle.

The materials for the reaction were as follows:

|  | Grams | Moles |
| --- | --- | --- |
| Di-iso-amyl maleate | 256 | 1.00 |
| Sodium bisulfite 106% | 100 | 1.02 |
| Water | 113 | |
| Ethyl Alcohol (2B) | 39 | |

The reaction temperature was maintained between 83° C. and 88° C. 2.5 grams of sodium pyrosulfite (meta-bisulfite) were added after 3 hours and 25 minutes of refluxing. The completion of the reaction was indicated at only about 3 hours, at which time the acid number was determined to be less than 0.7.

EXAMPLE 4

The apparatus used for the sulfonation step in this preparation was a two-liter, three-neck flask equipped with a reflux condenser, thermometer and agitator. Heat was supplied by an electric mantle such as a "Glascol" mantle. A 100 watt mercury arc lamp (General Electric Type AH–4) was placed immediately next to the flask above the Glascol mantle.

The materials for the reaction were as follows:

|  | Grams | Moles |
| --- | --- | --- |
| Di-iso-butyl maleate | 228 | 1.00 |
| Sodium bisulfite 106% | 100 | 1.02 |
| Water | 113 | |
| Ethyl Alcohol (2B) | 39 | |

The reaction temperature was maintained between 83° C. and 88° C. 2.5 grams of sodium pyrosulfite (meta-bisulfite) were added after 3½ hours of refluxing. The reaction time was considerably less than that observed for non-ultraviolet catalyzed reactions.

EXAMPLE 5

The sulfonation procedures set forth in Example 1 were carried out substantially as set forth therein with the exception that di-octyl fumarate (boiling point 180 to 190° C. at 4 mms.) prepared by the esterification of fumaric acid with 2-ethyl hexanol was used instead of the di-iso-octyl maleate. A General Electric lamp (AH–4) was used and the reaction time was considerably shorter than the time required when no ultraviolet radiation source was employed.

Although I have described but a few specific examples of my inventive concept, I consider the same not to be limited thereby nor to the specific substances mentioned therein, but to include various other compounds of equivalent constitution as set forth in the claims appended hereto. It is to be understood, of course, that any suitable changes, modifications and variations may be made without departing from the scope and spirit of the invention.

I claim:

1. A method of producing a di-ester of sulfosuccinic acid which comprises subjecting a di-ester of an acid from the group consisting of maleic acid and fumaric acid to the sulfonating action of an aqueous solution of a bisulfite while irradiating the reaction zone and the reactants therein with ultraviolet radiations having an intensity of at least 1000 microwatts per square centimeter, the greater part of the radiations falling within the limits of from about 2000 Angstrom units to about 4000 Angstrom units.

2. A method as defined in claim 1 wherein the greater part of the radiations fall within the limits of from about 2920 Angstrom units to about 3800 Angstrom units.

3. A method of producing a di-ester of sulfosuccinic acid which comprises subjecting a di-ester of an acid from the group consisting of maleic acid and fumaric acid to the sulfonating action of an aqueoues solution of a bisulfite while irradiating the reaction zone and the reactants therein with ultraviolet radiations, the greater part of the radiations falling within the limits of from about 2920 Angstrom units to about 3800 Angstrom units, said radiations having an intensity of at least 1000 microwatts per square centimeter throughout substantially all the reaction zone.

4. A method as defined in claim 3 wherein the greater part of the radiations fall within the limits of from about 292 Angstrom units to about 3800 Angstrom units.

5. A method as defined in claim 3 wherein the radiations have an intensity of from about 1000 microwatts to about 15 watts per square centimeter.

6. A method of producing a di-ester of a saturated sulfoaliphatic dicarboxylic acid which comprises reacting the corresponding unsaturated aliphatic dicarboxylic acid ester with an aqueous solution of a bisulfite while irradiating the reaction zone with radiations from a lamp, the greater part of the radiations emitted from the lamp falling within the limits of from about 2000 Angstrom units to about 4000 Angstrom units, said radiations having an intensity of at least 1000 microwatts per square centimeter throughout substantially all the reaction zone.

7. A method as defined in claim 6 wherein the greater part of the radiations fall within the limits of from about 2920 Angstrom units to about 3800 Angstrom units.

8. A method as defined in claim 6 wherein the radiations have an intensity of from about 1000 microwatts to about 15 watts per square centimeter.

References Cited in the file of this patent

UNITED STATES PATENTS

| | | |
|---|---|---|
| 2,028,091 | Jaeger | Jan. 14, 1936 |
| 2,383,320 | Kharasch | Aug. 21, 1945 |
| 2,398,479 | Vaughan et al. | Apr. 16, 1946 |
| 2,485,099 | Kharasch | Oct. 18, 1949 |

UNITED STATES PATENT OFFICE

CERTIFICATE OF CORRECTION

Patent No. 2,879,214                        March 24, 1959

Ralph Dettmer Divine

It is hereby certified that error appears in the printed specification of the above numbered patent requiring correction and that the said Letters Patent should read as corrected below.

Column 6, line 58, for "2920" read -- 2000 --; same line, for "3800" read -- 4000 --; line 64, for "292" read -- 2920 --.

Signed and sealed this 30th day of June 1959.

(SEAL)

Attest:
KARL H. AXLINE

Attesting Officer

ROBERT C. WATSON
Commissioner of Patents